(12) United States Patent
Fabre et al.

(10) Patent No.: US 7,209,855 B2
(45) Date of Patent: Apr. 24, 2007

(54) METHOD AND DEVICE FOR FILTERING INFORMATION EMITTED BY A PRESSURE SENSOR MOUNTED ON A WHEEL OF A VEHICLE

(75) Inventors: Laurent Fabre, Portet sur Garonne (FR); Georges Fonzes, Juan-les Pins (FR)

(73) Assignee: Siemens VDO Automotive, Toulouse Cedex (FR)

( * ) Notice: Subject to any disclaimer, the term of this patent is extended or adjusted under 35 U.S.C. 154(b) by 0 days.

(21) Appl. No.: 11/216,193

(22) Filed: Sep. 1, 2005

(65) Prior Publication Data
US 2006/0047469 A1   Mar. 2, 2006

(30) Foreign Application Priority Data
Sep. 1, 2004   (FR) .................................. 04 09237

(51) Int. Cl.
*G01L 7/00* (2006.01)
*G01L 9/00* (2006.01)

(52) U.S. Cl. ..................... 702/138; 702/140; 73/146; 340/442

(58) Field of Classification Search ................ 702/138, 702/140, 130, 35; 73/146, 146.2; 340/438, 340/442, 443
See application file for complete search history.

(56) References Cited

U.S. PATENT DOCUMENTS 4,893,110 A    1/1990   Herbert et al.
5,900,809 A    5/1999   Herbert et al.
2003/0074961 A1*  4/2003   Fischer et al. ................ 73/146

FOREIGN PATENT DOCUMENTS

| EP | 1 270 275 | 1/2003 |
|----|-----------|--------|
| EP | 1 384 604 | 1/2004 |
| FR | 2 680 135 | 2/1993 |

* cited by examiner

*Primary Examiner*—Bryan Bui
*Assistant Examiner*—Meagan S. Walling
(74) *Attorney, Agent, or Firm*—Young & Thompson

(57) ABSTRACT

The invention relates to a method for filtering information emitted, on the basis of pressure measurements taken by a pressure sensor mounted on a wheel of a vehicle equipped with a tire, to a central unit mounted on the vehicle. According to this method, a value representative of the pressure of the air in the tire is measured periodically, with a period $\theta$, and from this any possible variations $\Delta P$ in pressure between the values of the pressures successively measured are deduced; in parallel, with the same period $\theta$, a value representative of the temperature of the air in the tire is measured. In addition, when there is a variation $\Delta P$ in pressure between two measured pressure values, that is greater in terms of absolute value than a predetermined threshold Sp, the variation $\Delta T$ between the two temperature values measured at the same instants as the measured pressures is calculated. The emission of a signal representative of a variation in pressure to the central unit is commanded only if the comparative change in the pressure and in the measured temperature might be representative of a variation of the amount of air in the tire.

4 Claims, No Drawings

METHOD AND DEVICE FOR FILTERING INFORMATION EMITTED BY A PRESSURE SENSOR MOUNTED ON A WHEEL OF A VEHICLE

FIELD OF THE INVENTION

The invention relates to a method and a device for filtering information emitted on the basis of pressure measurements taken by a pressure sensor mounted on a wheel of a vehicle, to a central unit mounted on said vehicle.

BACKGROUND OF THE INVENTION

Increasing numbers of motor vehicles have, for safety reasons, monitoring systems comprising pressure sensors mounted on each of the wheels of the vehicle and dedicated to measuring the pressure in the tires with which these wheels are equipped, and intended to inform the driver of any abnormal variation in the measured pressure.

These monitoring systems conventionally comprise:

mounted on each of the wheels of the vehicle, a box—termed wheel unit—incorporating in particular a sensor, a microprocessor electrically powered by a battery, and an emitter, for example of the radiofrequency emitter or inductive emitter type, and, mounted on the vehicle, a central unit for receiving the signals emitted by the emitters, particularly provided with a computer incorporating a receiver, such as a radiofrequency receiver or an inductive receiver, connected to an aerial.

Usually, and for each tire:

measurements of the pressure of the air in this tire are taken periodically by the associated pressure sensor, then any variations $\Delta P$ in pressure between the values of the pressures successively measured are deduced from these measurements, and, finally, when a variation $\Delta P$ in pressure between two measured pressure values is higher in terms of absolute value than a predetermined threshold Sp, the emission of a signal representing a variation in pressure to the central unit is commanded.

The central unit for its part is programmed to process the signals emitted by the sensors in each wheel and, particularly after comparing and correlating said signals, to deliver a message able to inform the driver of an abnormal pressure variation in one of the wheels of the vehicle, and to identify the wheel concerned.

One of the disadvantages of such a design lies in the fact that all the variations in tire pressure higher than the predetermined threshold give rise to the emission of a signal to the central unit which alone, by virtue of its computational power and its ability to compare and correlate the signals received from the various sensors, is able to process the signals received in such a way as to determine whether they do actually represent a true anomaly in the tire inflation pressure.

Now, the processing performed by the central unit has revealed that a large proportion of the signals emitted to this unit are not representative of a true anomaly in the tire inflation pressure and these signals therefore have no justification in being emitted.

It is therefore apparent from this observation that a great many signals are needlessly emitted to the central unit by the wheel unit, thus shortening the battery life of the batteries used to power the microprocessors fitted on the wheels and needlessly and significantly "contaminating" the environment surrounding the vehicle, thus giving rise to increased risks of parasitic interference between nearby vehicles.

SUMMARY OF THE INVENTION

The present invention is aimed at alleviating this disadvantage and its main objective is to provide a method for filtering the signals emitted to a central unit of a monitoring system mounted on a vehicle.

To this end, the invention is aimed firstly at a method for filtering information emitted, on the basis of pressure measurements taken by a pressure sensor arranged in a wheel unit, said wheel unit itself being mounted on a wheel of a vehicle equipped with a tire, toward a central unit mounted on said vehicle, said method being characterized in that the wheel unit:

measures periodically, with a period $\theta$, a value representative of the pressure of the air in the tire, and from this deduces any variations $\Delta P$ in pressure between the values of the pressures successively measured, in parallel, with the same period $\theta$, measures a value representative of the temperature of the air in the tire and, when a variation $\Delta P$ in pressure between two successively measured pressure values is greater, in terms of absolute value, than a predetermined threshold Sp, the wheel unit:

calculates the variation $\Delta T$ between the two temperature values measured at the same instants as said measured pressures, from this deduces a compensation coefficient Cp such that $Cp=\Delta P/\Delta T$, and commands the wheel unit to emit a signal representative of a pressure variation to the central unit if:

a) $\Delta T=0$, or if b) the compensation coefficient Cp is positive and higher than a determined threshold coefficient Cp1, or if c) the compensation coefficient Cp is negative and does not lie between a minimum threshold and a maximum threshold.

DETAILED DESCRIPTION OF THE INVENTION

Thus, according to the invention, a pressure alarm message is sent by the wheel unit to the central unit only when the variation in pressure measured by the wheel unit does not seem to correspond to the corresponding temperature variation. This non-correlation between the variations in pressures and in temperature arises in three different cases:

First case: there is a variation in pressure without a variation in temperature (the case where $\Delta T=0$).

Second case: there is an increase in pressure associated with an increase in temperature, or a decrease in pressure associated with a decrease in temperature, but these variations do not correspond to a normal correlation (the case where Cp is positive but above a threshold).

Third case: there is a variation in pressure and a variation in temperature in the opposite direction (one increases while the other decreases) and Cp does not lie between a Cp minimum and a Cp maximum (does not lie in a given bandwidth).

In each of these three cases there is no normal correlation between the variations in pressure and in temperature and so the unit sends an alarm message to the central unit. In all other cases, the variations in pressures and in temperature are correlated and so no message will be sent by the wheel unit.

It will be noted that the pressure variation threshold Sp is expressed in terms of absolute value and that in fact the negative pressure variation threshold Spn and the positive pressure variation threshold Spp may be distinct in terms of absolute value.

Thus, the present invention makes it possible to filter the messages emitted by the wheel unit to the central unit. Only messages likely to correspond to a true pressure anomaly are sent for processing to the central unit.

The invention therefore makes it possible to reduce the number of messages emitted by the wheel unit and therefore limits the power consumption thereof. The batteries powering the wheel unit thus see an increase in their life.

The correlation that there is between a variation in pressure and a variation in temperature that is "normal" stems from the application of a law similar to the perfect gas law to the air contained in the tire; this law is of the type:

$$PV=nRT$$

with:
P: air pressure
V: volume of air occupied by the n moles
n: number of moles of air
R: perfect gas constant
T: absolute temperature of the air.

The law governing the correlation between the variations in pressure and in temperature is only similar to the perfect gas law because:
  air is not a perfect gas,
  the measured values P and T are representative of the pressure and of the temperature of the air but are "contaminated" by other factors such as vibrations, knocks, the temperature of the wheel rim,
  the volume of the air can change with the definitions of the tire without it being possible to evaluate this with precision,
  the simultaneity of the pressure and temperature measurements is not true because although the pressure can be measured almost instantaneously, the temperature measurements for their part are delayed with respect to the true evolution in air temperature because they are disturbed by the surroundings of the tire (the wheel rim, tire, etc.).

According to this law which is similar to the perfect gas law (established empirically for each type of vehicle and tire) it is therefore possible to determine whether the variations in measured pressures correlate with those of the concomitant temperatures. By applying this law similar to the perfect gas law a pressure variation of 10 mbar is considered, for example, to be normal, if, at the same time, there is a temperature variation of the order of 1° C. for a given type of vehicle.

The threshold Cp1 (when Cp is positive) and the minimum and maximum thresholds (when Cp is negative) are determined for each typical vehicle. Likewise, the threshold Sp beyond which it is considered that a significant pressure variation has occurred is predetermined in such a way as to implement the filtering method according to the invention only if the pressure has varied sufficiently. The level of this threshold makes it possible to set the sensitivity of the tire pressure monitoring system.

Of course, the variations in pressure with which simultaneous variations in temperature are correlated are interpreted as not signifying a variation in the amount of air contained in the tire. As a consequence, these pressure variations do not give rise to the emission of signals to the central unit and the number of these emissions is appreciably reduced by comparison with the number logged in current monitoring systems.

By way of example, a significant reduction in the emissions of signals occurs during the cooling-down phase that follows the bringing of a vehicle to a standstill.

Advantageously according to the invention, the wheel unit is commanded to emit a signal to the central unit only if the conditions listed at points a) to c) hereinabove are satisfied for a duration t greater than a predetermined time.

This additional condition leads in particular to short-duration variations in the pressure of the tire with which temperature variations do not correlate being considered as insignificant.

By way of example, this advantageous embodiment makes it possible to "filter" an increase in pressure resulting from the "squashing" of a tire as a vehicle negotiates a bend.

The invention covers a device for filtering information emitted, on the basis of pressure measurements taken by a pressure sensor arranged in a wheel unit mounted on a wheel of a vehicle equipped with a tire, to a central unit mounted on said vehicle, said device being characterized in that it comprises, mounted on said wheel:
  means of measuring a value representative of the pressure of the air in the tire,
  means of measuring a value representative of the temperature in the tire,
  a calculation unit connected to the measurement means and programmed to:
    periodically, with a period θ, acquire the measured values representative of the pressure of the air in the tire and calculate any possible variations Δp in pressure between the values of the pressures successively measured,
    in parallel, with the same period θ, acquire the measured values representative of the temperature of the air in the tire,
  and, when a variation ΔP in pressure between two successively measured pressure values is greater, in terms of absolute value, than a predetermined threshold Sp:
    calculate the variation ΔT between the two temperature values measured at the same instants as said measured pressures,
    from this deduce a compensation coefficient Cp such that Cp=ΔP/ΔT, and
    command the wheel unit to emit a signal representative of a pressure variation to the central unit if:
      a) ΔT=0, or if
      b) the compensation coefficient Cp is positive and higher than a determined threshold coefficient Cp1, or if
      c) the compensation coefficient Cp is negative and does not lie between a minimum threshold and a maximum threshold.

The invention claimed is:
1. A method for filtering information emitted, on the basis of pressure measurements taken by a pressure sensor arranged in a wheel unit mounted on a wheel of a vehicle equipped with a tire, to a central unit mounted on said vehicle, the method comprising that the wheel unit:
  measures periodically, with a period θ, a value representative of the pressure of the air in the tire, and from this deduces any variations ΔP in pressure between the values of the pressures successively measured, in parallel, with the same period θ, measures a value representative of the temperature of the air in the tire, and, when a variation ΔP in pressure between two successively measured pressure values is greater, in terms of absolute value, than a predetermined threshold Sp, the wheel unit:

calculates the variation ΔT between the two temperature values measured at the same instants as said measured pressures, from this deduces a compensation coefficient Cp such that Cp=ΔP/ΔT, and commands the wheel unit to emit a signal representative of a pressure variation to the central unit if:

a) ΔT=0, or if b) the compensation coefficient Cp is positive and higher than a determined threshold coefficient Cp1, or if c) the compensation coefficient Cp is negative and does not lie between a minimum threshold and a maximum threshold, wherein the negative pressure variation threshold Spn and the positive pressure variation threshold Spp are distinct in terms of absolute value.

2. The filtering method as claimed in claim 1, wherein the emission of a signal to the central unit is commanded only if the defined emission conditions, with thresholds that may be different, remain valid for a duration t greater than a predetermined time.

3. A method for filtering information emitted, on the basis of pressure measurements taken by a pressure sensor arranged in a wheel unit mounted on a wheel of a vehicle equipped with a tire, to a central unit mounted on said vehicle, the method comprising that the wheel unit:

measures periodically, with a period θ, a value representative of the pressure of the air in the tire, and from this deduces any variations ΔP in pressure between the values of the pressures successively measured, in parallel, with the same period θ, measures a value representative of the temperature of the air in the tire, and, when a variation ΔP in pressure between two successively measured pressure values is greater, in terms of absolute value, than a predetermined threshold Sp, the wheel unit:

calculates the variation ΔT between the two temperature values measured at the same instants as said measured pressures, from this deduces a compensation coefficient Cp such that Cp=ΔP/ΔT, and commands the wheel unit to emit a signal representative of a pressure variation to the central unit if:

a) ΔT=0, or if b) the compensation coefficient Cp is positive and higher than a determined threshold coefficient Cp1, or if c) the compensation coefficient Cp is negative and does not lie between a minimum threshold and a maximum threshold, wherein the emission of a signal to the central unit is commanded only if the emission conditions with thresholds that may be different, remain valid for a duration t greater than a predetermined time.

4. The filtering method as claimed in claim 3, wherein the emission of a signal to the central unit is commanded only if the defined emission conditions, with thresholds that may be different, remain valid for a duration t greater than a predetermined time.

* * * * *